(12) United States Patent
Sun et al.

(10) Patent No.: US 7,541,398 B2
(45) Date of Patent: Jun. 2, 2009

(54) METHOD FOR TRANSFORMATION OF CONVENTIONAL AND COMMERCIALLY IMPORTANT POLYMERS INTO DURABLE AND RECHARGEABLE ANTIMICROBIAL POLYMERIC MATERIALS

(75) Inventors: Yuyu Sun, Austin, TX (US); Zhaobin Chen, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 360 days.

(21) Appl. No.: 11/324,616

(22) Filed: Jan. 3, 2006

(65) Prior Publication Data

US 2006/0148940 A1 Jul. 6, 2006

Related U.S. Application Data

(60) Provisional application No. 60/640,985, filed on Jan. 3, 2005.

(51) Int. Cl.
*C08K 5/34* (2006.01)
*C08K 5/3492* (2006.01)
*C08K 5/3435* (2006.01)

(52) U.S. Cl. .......... 524/102; 524/99; 524/100
(58) Field of Classification Search .......... 524/99, 524/102, 100
See application file for complete search history.

(56) References Cited

U.S. PATENT DOCUMENTS

| | | | |
|---|---|---|---|
| 3,285,928 A | 11/1966 | Gubitz | |
| 3,488,701 A | 1/1970 | Herbes et al. | |
| 3,876,657 A | 4/1975 | Aelony et al. | |
| 3,971,757 A | 7/1976 | Rasberger | |
| 4,091,223 A | 5/1978 | Zussman et al. | |
| 4,241,208 A | 12/1980 | Murayama et al. | |
| 4,931,562 A | 6/1990 | Akabane et al. | |
| 5,057,562 A | 10/1991 | Reinert | |
| 5,459,145 A | 10/1995 | Saccomano et al. | |
| 5,490,983 A | 2/1996 | Worley et al. | |
| 5,580,872 A * | 12/1996 | Chu et al. | 514/19 |
| 5,670,064 A | 9/1997 | Worley et al. | |
| 5,670,646 A | 9/1997 | Worley et al. | |
| 5,705,545 A | 1/1998 | Avar et al. | |
| 5,714,127 A | 2/1998 | DeWitt et al. | |
| 5,817,806 A | 10/1998 | Rossi | |
| 5,882,357 A | 3/1999 | Sun et al. | |
| 5,889,130 A | 3/1999 | Worley et al. | |
| 5,902,818 A | 5/1999 | Worley et al. | |
| 6,020,491 A | 2/2000 | Wonley et al. | |
| 6,077,319 A | 6/2000 | Sun et al. | |
| 6,162,452 A | 12/2000 | Worley et al. | |
| 6,241,783 B1 | 6/2001 | Sun | |
| 6,294,185 B1 | 9/2001 | Worley et al. | |
| 6,482,756 B2 | 11/2002 | Li | |
| 6,576,154 B1 | 6/2003 | Li | |
| 6,585,989 B2 | 7/2003 | Herbst et al. | |
| 6,670,412 B1 | 12/2003 | Erderly et al. | |
| 6,762,225 B2 | 7/2004 | Malik et al. | |
| 6,770,287 B1 | 8/2004 | Sun et al. | |
| 6,878,761 B2 | 4/2005 | Gugumus | |
| 2003/0056297 A1 | 3/2003 | Sun | |
| 2003/0064645 A1 | 4/2003 | Worley et al. | |
| 2003/0216581 A1 | 11/2003 | Sun et al. | |
| 2004/0063831 A1 | 4/2004 | Sheppard et al. | |
| 2004/0086480 A1 | 5/2004 | Worley et al. | |
| 2004/0121681 A1 | 6/2004 | Quincy et al. | |
| 2004/0127667 A1 | 7/2004 | Worley et al. | |
| 2004/0191315 A1 | 9/2004 | Slattery et al. | |
| 2006/0148940 A1 | 7/2006 | Sun et al. | |
| 2007/0092724 A1 | 4/2007 | Li et al. | |

FOREIGN PATENT DOCUMENTS

| | | |
|---|---|---|
| DE | 19 00 169 A | 9/1969 |
| DE | 24 37 916 A | 2/1976 |
| DE | 24 37 917 A | 2/1976 |
| EP | 02 40 370 A | 10/1987 |
| WO | 96 08 949 A | 3/1996 |
| WO | 01/07550 A1 | 2/2001 |
| WO | 2005/058814 A2 | 6/2005 |

OTHER PUBLICATIONS

Chen, Z., et al., N-Chloro-Hindered Amines as Multifunctional Polymer Additives, Macromolecules (2005), 38:8116-8119.

Eknoian, M. W., et al., "Novel Antimicrobial N-halamine polymer coatings generated by emulsion polymerization," Polymer (1999), 40:1367-1371.

Qian, L., et al., "Durable and Regenerable Antimicrobial Textiles: Improving Efficacy and Durability of Biocidal Functions," J Appl Polym Sci (2004), 91:2588-2593.

Sun, et al., National Center Annual Report, NTC Project CO2-CD06 (Nov. 2002).

Albert, M., et al., "Structure-Activity Relationships of Oligoguanidines-Influence of Counterion, Diamine, and Average Molecular Weight on Biocidal Activies," Biomacromolecules, (2003), 4:1811-1817.

Appendini, P., et al., "Review of antimicrobial food packaging," Innov. Food Sci. Emerg. Tech. (2002), 3:113-126.

(Continued)

*Primary Examiner*—Kriellion A Sanders
(74) *Attorney, Agent, or Firm*—Edwin S. Flores; Chainey P. Singleton; Chalker Flores, LLP (57) ABSTRACT

The present invention includes compositions and methods of making an antimicrobial polymer by mixing sterically hindered N-halo-amines with polymeric materials with a source of halides selected from sodium di-X-isocyanurate, sodium hypohalite, N—X-succinimide, and calcium hypohalite, and mixtures and combinations thereof, wherein X is selected from Cl or Br, and wherein the sterically hindered halo-amines are charged before or after mixing with the polymers, or combinations thereof.

22 Claims, 1 Drawing Sheet

OTHER PUBLICATIONS

Binder, S., et al., "Emerging Infectious Diseases: Public Health Issues for the 21st Century," Science (1999), 284:1311-1313.

Braun, M., et al., "Antimicrobial Polymers Containing Melamine Derivatives. I. Preparation and Characterization of Chloromelamine-Based Cellulose," Polym. Sci., Part A: Polym. Chem. (2004), 42:3818-3827.

Chen, C. Z., et al., "Quaternary Ammonium Functionalized Poly(propylene imine) Dendrimers as Effective Antimicrobials: Structure-Activity Studies," Biomacromolecules, (2000), 1:473-480.

Eknoian, M. W., et al., "Monomeric and Polymeric N-Halamine Disinfectants," Ind. Eng. Chem. Res. (1998), 37:2873-2877.

Jansson, A., et al., "Degradation of post-consumer polypropylene materials exposed to simulated recycling—mechanical properties," Polym. Degrad. Stab. (2003), 82:37-46.

Kruczala, K., et al., "Thermal Aging of Heterophasic Propylene-Ethylene Copolymers: Morphological Aspects Based on ESR, FTIR, and DSC," Macromolecules (2003), 36:1899-1908.

Kruczala, K., et al., "Thermal Aging of Heterophasic Propylene-Ethylene Copolymers: Spatial and Temporal Aspects of Degradation Based on ESR, ESR Imaging, and FTIR," Macromolecules (2003), 36:1909-1919.

Lee, S. B., et al., "Permanent, Nonleaching Antibacterial Surfaces. 1. Synthesis by Atom Transfer Radical Polymerization," Biomacromolecules, (2004), 5:877-882.

Motyakin, M. V., et al., "Spectral Profiling by 1D and 2D Electron Spin Resonance Imaging: Nitroxide Radicals in UV and Thermal Degradation of Poly(acrylonitrile-butadiene-styrene) Containing a Hindered Amine Stabilizer," Macromolecules (2001), 34:2854-2864.

Motyakin, M. V., et al., "Electron Spin Resonance Imaging and ATR-FTIR Study of Poly(acrylonitrile-butadiene-styrene) Containing a Hindered Amine Stabilizer and Thermally Treated at 353 K," Macromolecules (2002), 35:3984-3992.

Muzzarelli, R. A. A., et al., "Fungistatic Activity of Modified Chitosans against *Saprolegnia parasitica*," Biomacromolecules, (2001); 2:165-169.

Rabea, E. I., et al., "Chitosan as Antimicrobial Agent: Applications and Mode of Action," Biomacromolecules, (2003), 4:1457-1465.

Setnescu, R., et al., "Chemiluminescence study on the oxidation of several polyolefins-I. Thermal-induced degradation of additive-free polyolefins," Polym. Degrad. Stab. (1998), 60:377-383.

Sun, Y., et al., "Synthesis, Characterization, and Antibacterial Activities of Novel N-Halamine Polymer Beads Prepared by Suspension Copolymerization," Macromolecules (2002), 35:8909-8912.

Sun, Y., et al., "Novel Refreshable N-Halamine Polymeric Biocides: Grafting Hydantoin-Containing Monomers onto High Performance Fibers by a Continuous Process," J. Appl. Polym. Sci. (2003), 88:1032-1039.

Tew, G. N., et al., "De novo design of biomimetic antimicrobial polymers," Proc. Natl. Acad. Sci. USA. (2002), 99:5110-5114.

Tiller, J. C., et al., "Designing Surfaces that Kill Bacteria on Contact," Proc. Natl. Acad. Sci. USA. (2001), 98:5981-5985.

International Search Report and Written Opinion for PCT/US2007/007506 dated Jul. 25, 2008.

\* cited by examiner

FIGURE 1

METHOD FOR TRANSFORMATION OF CONVENTIONAL AND COMMERCIALLY IMPORTANT POLYMERS INTO DURABLE AND RECHARGEABLE ANTIMICROBIAL POLYMERIC MATERIALS

CROSS-REFERENCE TO RELATED APPLICATIONS

This application claims priority to U.S. Provisional Application Ser. No. 60/640,985, filed Jan. 3, 2005, and is related to U.S. Provisional Application Ser. No. 60/707,331, filed Aug. 11, 2005 and U.S. patent application Ser. No. 10/431,029 filed May 6, 2003, the contents of each is incorporated by reference herein in its entireties.

TECHNICAL FIELD OF THE INVENTION

The present invention relates in general to the field of antimicrobials, and more particularly, to compositions and methods to make and recharge antimicrobial additives for polymeric materials.

BACKGROUND OF THE INVENTION

Without limiting the scope of the invention, its background is described in connection with polymeric biocides.

In response to the wide spreading of infectious pathogens (1), antimicrobial polymers, polymers that can effectively inactivate microorganisms upon contact, have attracted considerable interests (2-12). The simplest and most cost-effective method in the preparation of antimicrobial polymeric materials is to directly add antimicrobial additives into polymer structures during processing and has been extensively used in the production of woods, papers, plastics, textiles, coatings, etc. (13-14). Traditionally, the main purpose to add biocides into polymers is to protect the polymeric materials from deterioration and discoloration caused by microbial attacks (15-16). Therefore, some of the antimicrobial additives are actually preservatives, which have low antimicrobial activities and although antimicrobial are very toxic.

Recently, the development of antimicrobial additives that protect both the polymers and the users has become an urgent issue; however, successful examples are still limited (13-16). The major challenge is that to be successful, candidates of antimicrobial additives should meet the following requirements: they should be effective against a broad spectrum of microorganisms at low concentrations; they should have low toxicity to human, animals and the environment; they should be easily and inexpensively synthesized and processed; they should be compatible with the polymer, processing aids and other additives; they should have no negative impact on the properties and appearance of the polymers; they should be stable upon storage; and they should have long-lasting efficacy; etc. (14).

One example of a polymeric biocide is described in United States Patent Application 20030216581, filed by Sun, et al., N-halamine vinyl compounds and their polymeric biocides are described. More particularly, heterocyclic vinylic compounds are described that may be used to form biocidal polymers. The polymers may be used alone or grafted onto textiles, fabrics and polymers. The polymers are readily converted to N-halamine structures on exposure to a halogen source such as commercially available chlorine bleach. The N-halamine derivatives exhibit potent antibacterial properties against microorganisms and these properties are durable and regenerable.

U.S. Pat. No. 6,762,225, issued to Malik, et al., for light stabilizer composition and teaches a light stabilizer composition obtainable by mixing a polymer with at least one polyalkylpiperidine and at least one free radical generator and melt-blending of that mixture at a temperature above the melting point of the polymer and above the decomposition temperature of the free radical generator and at shear conditions sufficient to blend the components. The light stabilizers of this patent provide a method for enhancing the light stability of polymers, preferably polyolefins.

U.S. Pat. No. 6,670,412, issued to Erderly, et al., for a method of melt processing amine containing polyethylenes and teaches a processed linear polyethylenes containing an amine additive shown to exhibit improved processability through the addition of certain surfactants. The amine compounds are generally one or more hindered amine light stabilizers, amine antistats, amine antioxidants or amine based UV inhibitors. Among the melt processing parameters improved are reduced head pressure, reduced torque, reduced motor load, reduced or eliminated melt fracture, or combinations of these parameters.

U.S. Pat. No. 6,878,761, issued to Gugumus, for synergistic combinations of UV absorbers for pigmented polyolefins and teaches a polyolefin composition which includes an organic pigment, a sterically hindered amine light stabilizer and as UV absorber a mixture of a 2-hydroxyphenyl benzotriazole and a 2-hydroxyphenyl-s-triazine.

SUMMARY OF THE INVENTION

The present inventors have recognized that "traditional" polymer additives (or their derivatives) may be improved to provide antimicrobial functions. It has been found that the N-halo derivatives of Sterically Hindered Amines (SHAs), which were mainly used as light stabilizers of polymeric materials, can be such candidates. The majority of commercially important SHAs are piperidine derivatives, which are widely available with low cost and low toxicity (14-18). To date, they are one of the most effective photo-stabilizers of polymeric materials. The N-halo derivatives of SHAs could be readily synthesized by a simple halogenation reaction (19-20). Contrary to other halamines, hindered N-halamines prepared from SHAs are very stable and they were reported to be even better radiation stabilizers than their un-halogenated SHA precursors (21).

The SHA-based N-halamines additives of the present invention have been found to be powerful antimicrobial agents against both gram-negative and gram-positive bacteria. The use of the SHA-based N-halamines as novel antimicrobial additives may be used in conjunction with a wide range of polymeric materials.

A method for transformation of conventional and commercially important polymers into durable and rechargeable antimicrobial polymeric materials is described herein. The compositions and methods are used to produce Sterically Hindered N-halo-amine-based antimicrobial polymers. For example, the antimicrobial polymer additive may be a sterically hindered N-halo-amine including the moiety of 2,2,6,6-tetramethyl-N-chloro-4-piperidinyl structure. In some instances the sterically hindered N-halo-amine may have a molecular weight higher than 350 g/mol.

The present invention includes antimicrobial polymer additives having a sterically hindered N-halo-amine (SHH) structure. For example, the sterically hindered N-halo-amine may be selected made by mixing one or more of the following: Bis(N—X-2,2,6,6-tetramethyl-4-piperidyl)sebacate; Poly[[6-[(1,1,3,3-tetramethylbutyl)amino]-s-triazine-2,4- diyl]-N—X-[(2,2,6,6-tetramethyl-4-piperidyl)imino]-hexamethylene-[(2,2,6,6-tetramethyl-4-piperidylimino]];
N—X-[(2,2,6,6-tetramethyl-4-piperidyl)alkyl formate];
Poly[(6-morpholino-s-triazine-2,4-diyl)-N—X-[2,2,6,6-tetramethyl-4-piperidyl]imino]-hexamethylene[(2,2,6,6-tetramethyl-4-piperidyl)imino]]; 3-Dodecyl-N—X-(2,2,6,6-tetramethyl-4-piperidinyl)succinimide; 2,2,4,4-Tetramethyl-N-X-7-oxa-3,20-diazadispiro[5.1.11.2]-heneicosan-21-one; D-Glucitol, 1,3:2,4-bis-O—(N—X-2,2,6,6-tetramethyl-4-piperidinylidene); 1,1'-ethylenebis(N—X-3,3,5,5-tetramethyl-piperazinone); N—X-2,2,4,4-tetramethyl-7-oxa-20-(oxiranylmethyl)-3,20-diazadispiro[5.1.11.2]henicosan-21-one; 1,2,3,4-Butanetetracarboxylic acid, polymer with β,β,β',β'-tetramethyl-2,4,8,10-tetraoxaspiro[5.5]undecane-3,9-diethanol, N—X-2,2,6,6-tetramethyl-4-piperidinyl ester; Poly[oxy[methyl[3-[N—X-(2,2,6,6-tetramethyl4-piperidinyl)-oxy]propyl]silylene]]; 1,1',1"-[1,3,5-Triazine-2,4-6-triyltris[(cyclohexylimino)ethylene]]tris(N—X-3,3,5,5-tetramethyl-piperazinone); mixtures and combinations thereof.

Examples of common halides include Cl and Br. A source of halides may be, e.g., sodium di-X-isocyanurate, sodium hypohalite, N—X-succinimide, and calcium hypohalite, wherein X is selected from Cl or Br. The additive may be mixed with polymeric materials prior to, or after halogenation reactions thereof. Generally, the additive is an antimicrobial against gram-negative bacteria such as *Escherichia coli* (e.g., multi-drug resistant species, such as species that are resistant to sulfonamide) and gram-positive bacteria such as *Staphylococcus aureus* (e.g., multi-drug resistant species, such as species that are resistant to tetracycline, penicillin, streptomycin, and erythromycin) or species that are resistant to the mixtures and combinations or the drugs thereof. The additive may be added to a polymer formed by extrusion, injection molding, hot pressing, coating, painting, solvent casting, mixtures and combinations thereof. Other examples of uses for the additive and polymers formed therewith include, e.g., a bead, a film, a tube, a sheet, a thread, a suture, a gauze, a bandage, an adhesive bandage, a vessel, a container, a cistern, a filter, a membrane, a coating, a paint and combinations thereof.

Sterically Hindered N-Halo-amines (SHHs), e.g. Sterically Hindered Chloramines (SHCs) can be formed by the halogenation, e.g. chlorination of sterically hindered amines. It is found in this invention that SHCs have potent, durable and rechargeable antimicrobial activities against both gram-negative and gram-positive bacteria and also has shown activity against a variety of pathogens including bacteria, virus, spores, fungi, bacteria phage and combinations thereof. For example, the additive is antimicrobial against gram-negative bacteria such as *Escherichia coli* (e.g., multi-drug resistant species, such as species that are resistant to sulfonamide), and gram-positive bacteria such as *Staphylococcus aureus* (e.g., multi-drug resistant species, such as species that are resistant to tetracycline, penicillin, streptomycin, and erythromycin) or species that are resistant to the mixtures and combinations or the drugs thereof. Different methods may be used to physically add SHCs into conventional and commercially important polymeric materials (e.g., plastics, rubbers, fibers, coatings, paints etc.) as antimicrobial polymer additives in the range of about 0.01 to about 30 weight percent.

Two methods are employed to incorporate SHHs into commercially important polymeric materials. In the first method, SHHs are first synthesized from SHAs and then added into the polymer materials by solution blending and/or thermal blending. The polymers are then processed into desired forms, e.g., a bead, a film, a tube, a sheet, a thread, a suture, gauze, a bandage, an adhesive bandage, a vessel, a container, a cistern, a filter, a membrane, a coating, paint and combinations thereof. In the second method, SHAs are added into the polymeric materials by solution and/or thermal blending. The polymers are processed into desired forms, and then treated with halogen sources to transform the SHAs into SHHs, such as treated with chlorine bleach to transform the SHAs into SHCs. Both methods can be readily used to incorporate SHHs into conventional and commercially important polymers to transform them into antimicrobial polymeric materials. The resultant polymeric materials demonstrate potent antimicrobial activities against both gram-negative and gram-positive bacteria. Moreover, upon the loss of the antimicrobial activity due to extensive uses and/or prolonged storage, the antimicrobial activity can be easily recharged by a simple halogen-treatment. For instance, the antimicrobial activity may be recharged through the chlorination or bromination of pools and spas, washing, soaking or treating the material in a bleach, or treatment use in a water treatment systems including conduits and piping.

Therefore, the present invention provides simple, practical, flexible, and cost-effective technologies to transform conventional and commercially important polymers into durable and rechargeable antimicrobial polymeric materials, which will find wide applications in medical devices, hospital equipment, water purification/delivery systems, food storage and packaging, hygienic products, consumer products, household items, bio-protective applications and other related challenging environments where self-decontamination of the polymeric material is needed.

BRIEF DESCRIPTION OF THE DRAWINGS

For a more complete understanding of the features and advantages of the present invention, reference is now made to the detailed description of the invention along with the accompanying figure in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "alkyl," by itself or as part of another substituent, means, unless otherwise stated, a straight or branched chain, or cyclic hydrocarbon radical, or combination thereof, which may be fully saturated, mono- or poly-unsaturated and can include di-valent and multivalent radicals, having the number of carbon atoms designated. Examples of saturated hydrocarbon radicals include groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds, e.g., vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined as "heteroalkyl" or "homoalkyl."

As used herein the term "alkylene" by itself or as part of another substituent means a divalent radical derived from an alkane, as exemplified by —$CH_2CH_2CH_2CH_2$—, and further includes those groups known as "heteroalkylenes."

As used herein the terms "alkoxy," "alkylamino," "alkylthio" and "thioalkoxy" are used in their conventional sense, and refer to those alkyl groups attached to the remainder of the molecule via an oxygen atom, an amino group or a sulfur atom, respectively.

As used herein the term "heteroalkyl," by itself or in combination with another term, means, unless otherwise stated, a stable straight or branched chain, or cyclic hydrocarbon radical, or combinations thereof, consisting of the stated number of carbon atoms and from one to three heteroatoms selected from the group consisting of O, N, Si and S, and wherein the nitrogen and sulfur atoms may optionally be oxidized and the nitrogen heteroatom may optionally be quaternized. The heteroatom(s) O, N and S may be placed at any interior position of the heteroalkyl group. Examples include —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_3$, —$CH_2$—$CH_2$,—S(O)—$CH_3$, —$CH_2$—$CH_2$—S(O)$_2$—$CH_3$, —CH.dbd.CH—O—$CH_3$, —Si(CH3)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified by —$CH_2$—$CH_2$—S—$CH_2CH_2$—and —$CH_2$—S—$CH_2$—$CH_2$—NH—$CH_2$—. Still further, for alkylene and heteroalkylene linking groups, no orientation of the linking group is implied.

As used herein the terms "cycloalkyl" and "heterocycloalkyl," by themselves or in combination with other terms, represent, unless otherwise stated, cyclic versions of "alkyl" and "heteroalkyl," respectively.

As used herein the terms "halo" or "halogen," by themselves or as part of another substituent, mean, unless otherwise stated, a fluorine, chlorine, bromine, or iodine atom. Additionally, terms such as "haloalkyl" are meant to include monohaloalkyl and polyhaloalkyl.

As used herein for brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

As used herein the term "acyl" refers to those groups derived from an organic acid by removal of the hydroxy portion of the acid. Accordingly, acyl is meant to include, for example, acetyl, propionyl, butyryl, decanoyl, pivaloyl, benzoyl and the like.

Substituents for the alkyl and acyl (including those groups often referred to as alkylene, alkenyl, heteroalkylene, heteroalkenyl, alkynyl, cycloalkyl, heterocycloalkyl, cycloalkenyl, and heterocycloalkenyl) can be a variety of groups selected from: —OR', =O, =NR', =N—OR', —NR'R", —SR', -halogen, —SiR'R"R'", —OC(O)R', —C(O)R',—$CO_2$R', —CONR'R", —OC(O)NR'R", —NR"C(O)R', —NR'—C(O)NR"R'", —NR"C(O)$_2$R', —NR—C(NRR'R") =NR'", —NR'C(NR'R")=NR'", —NR—C(NR'R")=NR'", —S(O)R', —S(O)$_2$R', —S(O)$_2$NR'R", —NRSO$_2$R', —CN and —$NO_2$ in a number ranging from zero to (2m'+1), where m'is the total number of carbon atoms in such radical. R', R" and R'" each independently refer to hydrogen, and heteroalkyl, unsubstituted aryl, aryl substituted with halogens, unsubstituted alkyl, alkoxy or thioalkoxy groups, or aryl-($C_1$-$C_{10}$)alkyl groups. When a compound of the invention includes more than one R group, for example, each of the R groups is independently selected as are each R', R" and R'" groups when more than one of these groups is present. When R'and R" are attached to the same nitrogen atom, they can be combined with the nitrogen atom to form a 5-, 6-, or 7-membered ring. As used herein, the term "heteroatom" is meant to include oxygen (O), nitrogen (N), sulfur (S) and silicon (Si).

Sterically hindered N-halo-amines are a class of novel rechargeable disinfectants, e.g., N-halamines. Currently, N-halamine-based antimicrobial polymers are produced by three major methods, including functional modification of the polymers, (co)polymerization of polymerizable N-halamine precursors and grafting of polymerizable N-halamine precursors onto the target polymers. Each of these technologies is suitable for the treatment of certain polymers, but a "universal" technology that can treat most conventional and commercially important polymeric materials has not been developed yet. Furthermore, the current technologies involve one or more chemical modifications to prepare the final antimicrobial polymeric materials, which inevitably requires new/special steps and increases cost in the transformation of ordinary polymeric materials into antimicrobial polymers. The present inventors recognized that these difficulties are part of the reasons why commercially important antimicrobial polymers have not been developed.

In this invention, sterically hindered N-halo-amines are physically mixed with conventional and commercially important polymeric materials as antimicrobial additives. As long as the target polymeric materials can be dissolved in solvent(s), or can be melted, they can be manufactured into SHHs-containing polymeric materials, providing durable and rechargeable antimicrobial activities. Because dissolving and melting are conventional processing steps in the manufacturing of most polymeric materials, the present invention provides a universal technology to produce antimicrobial polymers. For polymeric materials that are not soluble and/or meltable, SHHs can be painted or coated onto the polymeric materials.

Furthermore, sterically hindered N-halo-amines used in the present invention are synthesized by a halogenation, e.g., chlorination, treatment of sterically hindered amines either before or after mixing with polymeric materials. Sterically hindered amines are one of the most important photo-stabilizers of polymers, which are none or low toxic, widely available and relative inexpensive.

In summary, compared with the current technologies, the present invention provides simple, practical, flexible and cost-effective approaches to transform conventional and commercially important polymers into antimicrobial polymeric materials. The present invention will find widespread use in numerous areas of application. For example, soluble and/or meltable polymers can be manufactured into durable and rechargeable antimicrobial materials, and a wide range of surfaces can be transformed into durable and rechargeable antimicrobial materials by coating and or coating using this invention. The present invention is also suitable for the treatment of plastics, rubbers, paints, coatings, and fibers, including, but not limited to, polyolefins, polystyrene and its derivatives, ABS, EPDM, cellulose acetate, polyurethane, etc.

The simple, practical, flexible and cost-effective sterically hindered N-halo-amines disclosed herein may be used as polymer additives in the range of about 0.01 to about 30.0 weight percent (wt. %), the typical range is about 0.2 to about 5.0 wt. %. Both solution and thermal blending can be used in the treatment. Sterically hindered N-halo-amines can be formed before or after mixing. The present invention will find wide applicability because it requires no new treatment steps, training and/or new equipment used in the transformation of conventional and commercially important polymers into durable and rechargeable antimicrobial materials.

The applications for use of the present invention include, e.g. antimicrobial treatment of plastics, rubbers, paints, coatings and fibers. The resulting materials may find applications in medical devices, hospital equipment, water purification/delivery systems, food storage and food packaging, hygienic products, consumer products, household items, bio-protective applications, and other related challenging environments where self-decontamination of the polymeric material is needed.

One of the advantages of the present invention is that sterically hindered N-halo-amines are derivatives of commercially available sterically hindered amines (SHAs) based light stabilizers derived from 2,2,6,6-tetramethylpiperidine (14-17). Commercially important SHAs have carefully designed and balanced structures to improve their compatibility with the target polymers to enhance long-term retention of the additive during ageing of the polymers. The present invention uses commercially available SHAs based on 2,2,6,6-tetramethylpiperidine with a molecular weight higher than 350 g/mol. Listed below are, but not limited to, examples of the SHAs used in this invention to produce antimicrobial SHHs: Bis(N—X-2,2,6,6-tetramethyl-4-piperidyl)sebacate; Poly[[6-[(1,1,3,3-tetramethylbutyl)amino]-s-triazine-2,4-diyl]-N—X-[(2,2,6,6-tetramethyl-4-piperidyl)imino]-hexamethylene-[(2,2,6,6-tetramethyl-4-piperidylimino]]; N—X-[(2,2,6,6-tetramethyl-4-piperidyl)alkyl formate]; Poly[(6-morpholino-s-triazine-2,4-diyl)-N—X-[2,2,6,6-tetramethyl-4-piperidyl]imino]-hexamethylene[(2,2,6,6-tetramethyl-4-piperidyl)imino]]; 3-Dodecyl-N—X-(2,2,6,6-tetramethyl-4-piperidinyl)succinimide; 2,2,4,4-Tetramethyl-N—X-7-oxa-3,20-diazadispiro[5.1.11.2]-heneicosan-21-one; D-Glucitol, 1,3:2,4-bis-O-(N—X-2,2,6,6-tetramethyl-4-piperidinylidene); 1,1'-ethylenebis(N—X-3,3,5,5-tetramethyl-piperazinone); N—X-2,2,4,4-tetramethyl-7-oxa-20-(oxiranylmethyl)-3,20-diazadispiro[5.1.11.2]henicosan-21-one; 1,2,3,4-Butanetetracarboxylic acid, polymer with β,β,β',β'-tetramethyl-2,4,8,10-tetraoxaspiro[5.5]undecane-3,9-diethanol, N—X-2,2,6,6-tetramethyl-4-piperidinyl ester; Poly[oxy[methyl[3-[N—X-(2,2,6,6-tetramethyl4-piperidinyl)-oxy]propyl]silylene]]; and 1,1',1''-[1,3,5-Triazine-2,4-6-triyltris[(cyclohexylimino)ethylene]]tris(N—X-3,3,5,5-tetramethyl-piperazinone).

The skilled artisan will recognize that many commercially available polymers as well as synthesized polymers may be used with the present invention. Table 1 is an exemplary structural list of some of the many commercially available SHAs that may be modified as disclosed herein. The SHAs may be modified with halogen sources, e.g. Cl or Br.

TABLE 1

| Name | Abbreviation | Molecular formula |
|---|---|---|
| Bis(2,2,6,6-tetramethyl-4-piperidyl) sebacate | SHA-1 |  |
| Poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidylimino]] | SHA-2 |  |

TABLE 1-continued

| Name | Abbreviation | Molecular formula |
|---|---|---|
| (2,2,6,6-tetramethyl-4-piperidyl) alkyl formate | SHA-3 |  Where R is: $C_{11}$-$C_{20}$, predominantly, $C_{16}$-$C_{18}$ |
| Poly[(6-morpholino-s-triazine-2,4-diyl)-[2,2,6,6-tetramethyl-4-piperidyl]imino]-hexamethylene[(2,2,6,6-tetramethyl-4-piperidyl)imino]] | SHA-4 |  |

Preparation and Antimicrobial Functions of Sterically Hindered N-halo-amines from SHAs. The sterically hindered N-halo-amines may contain halogen atoms such as Cl or Br. Table 2 is an exemplary structural list of sterically hindered N-halo-amines that contain Cl (SHCs) which may be used as disclosed herein.

TABLE 2

| Name | Abbreviation | Molecular formula |
|---|---|---|
| Bis(N-chloro-2,2,6,6-tetramethyl-4-piperidyl) sebacate | SHC-1 |  |
| Poly[[6-[(1,1,3,3-tetramethylbutyl)amino]-s-triazine-2,4-diyl]-N-chloro-[(2,2,6,6-tetramethyl-4-piperidyl)imino]-hexamethylene-[(2,2,6,6-tetramethyl-4-piperidylimino]] | SHC-2 |  |

TABLE 2-continued

| Name | Abbreviation | Molecular formula |
|---|---|---|
| N-chloro-[(2,2,6,6-tetramethyl-4-piperidyl) alkyl formate] | SHC-3 |  Where R is: $C_{11}$-$C_{20}$, predominantly, $C_{16}$-$C_{18}$ |
| Poly[(6-morpholino-s-triazine-2,4-diyl)-N-chloro-[2,2,6,6-tetramethyl-4-piperidyl]imino]-hexamethylene[(2,2,6,6-tetramethyl-4-piperidyl)imino]] | SHC-4 |  |

Exemplary Description of the Synthesis of the Sterically Hindered N-Halo-amines.

EXAMPLE 1

SHC-1. A solution of sodium dichloroisocyanurate (DC-CANa, about 8.8 grams, about 0.04 mol) in water (about 40 ml) was added to a solution of about 9.6 grams (about 0.04 mol) SHA-1 in toluene (about 20 ml). The mixture was vigorously shaken for about 10 minutes. Toluene (about 10 ml) was then added. The precipitated cyanuric acid was filtered off. The organic layer was separated from water. After the evaporation of toluene, the solid was collected and recrystallized from petroleum ether to produce a yield of 77%, a melting temperature of 83° C. and an active chlorine content of 12.5%.

Figure 1:
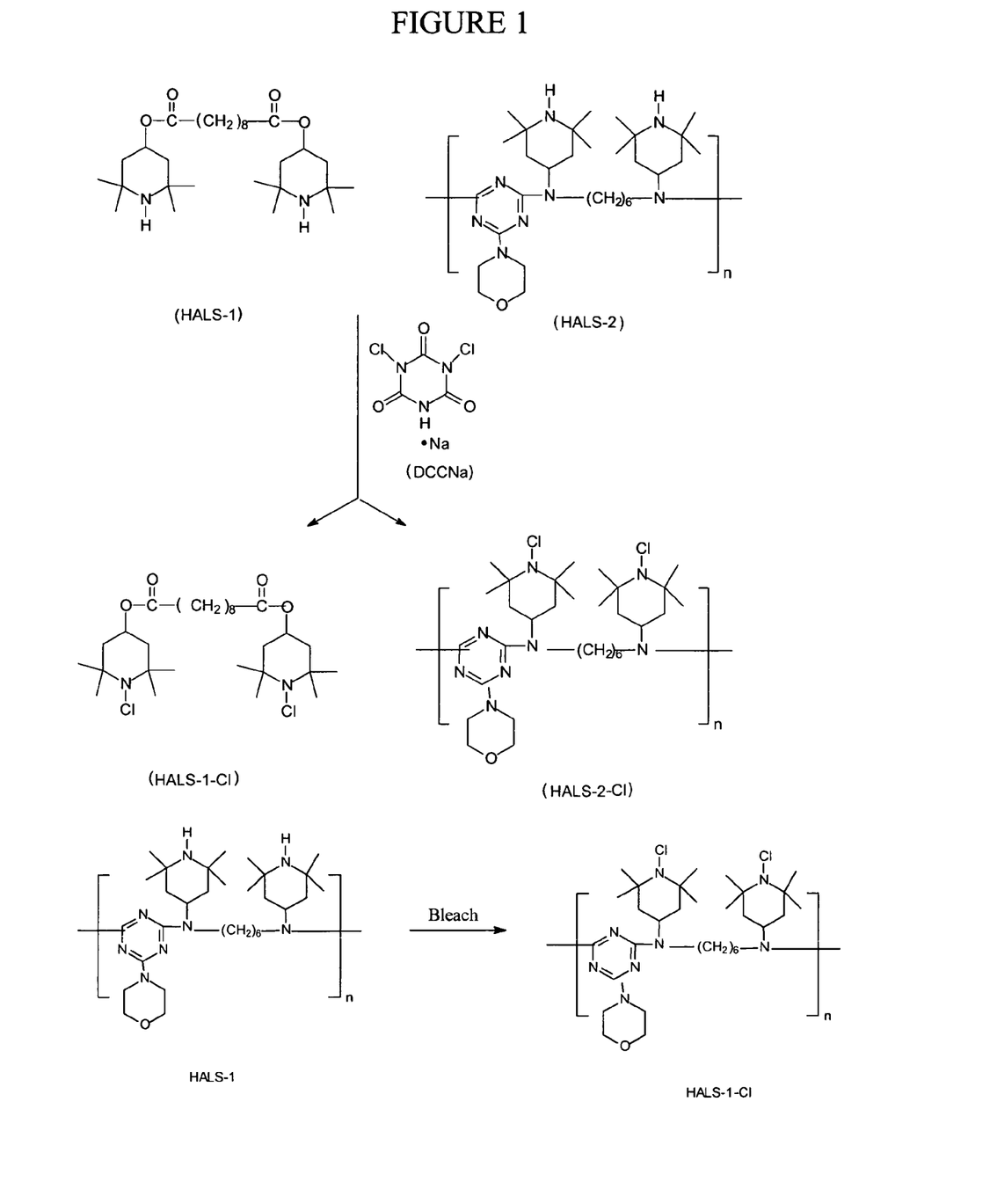
FIG. 1 shows a pathway for the synthesis of two examples of hindered N-halo-amines of the present invention.

FIG. 1 illustrates one of the synthesis methods associated with the present invention. The present invention provides that Bis(2,2,6,6-tetramethyl-4-piperidyl) sebacate (HALS-1) is be treated with sodium dichloroisocyanurate (DCCANa) to produce Bis(N-chloro-2,2,6,6-tetramethyl-4-piperidyl)sebacate (HALS-1-Cl).

EXAMPLE 2

SHC-2. A solution of DCCANa (about 8.8 grams, 0.04 mol) in water (about 40 ml) was added to a solution of about 5.95 g (about 0.04 mol) SHA-2 in toluene (about 20 ml). The mixture was vigorously shaken for about 20 minutes. Toluene (about 10 ml) was then added. The precipitated cyanuric acid was filtered off. The organic layer was separated from water and then dried under anhydrous $CaCl_2$. About 50 ml of methanol was added; the precipitates were collected by filtration, washed with methanol, air-dried over night and stored in a desiccator at room temperature for about 72 hours to reach constant weight to produce a yield of about 75%, a melting point of about 280° C. (dec.) and an active chlorine content of about 7.96%.

EXAMPLE 3

SHC-3. A solution of DCCANa (about 8.8 grams, 0.04 mol) in water (about 40 ml) was added to a solution of about 8.2 grams (about 0.04 mol) SHA-3 in toluene (about 20 ml). The mixture was vigorously shaken for about 10 minutes. Toluene (about 10 ml) was then added. The precipitated cyanuric acid was filtered off. The organic layer was separated from water. After the evaporation of toluene, the solid was collected and recrystallized from petroleum ether to produce a yield of about 79%, a melting point of about 32° C. and an active chlorine content of about 7.86%.

EXAMPLE 4

SHC-4. A solution of DCCANa (about 8.8 g, 0.04 mol) in water (about 40 ml) was added to a solution of about 10.2 grams SHA-4 in toluene (about 20 ml). The mixture was vigorously shaken for 20 minutes. Toluene (10 ml) was then added. The precipitated cyanuric acid was filtered off. The organic layer was separated from water and then dried under anhydrous $CaCl_2$. About 50 ml of methanol was added; the precipitates were collected by filtration, washed with methanol, air-dried over night and stored in a desiccator at room temperature for about 72 hours to reach constant weight to produce a yield of about 81%, a melting point of about 280° C. (dec.) and an active chlorine content of about 10.6%.

FIG. 1 illustrates another of the synthesis methods associated with the present invention. The present invention provides that Poly[(6-morpholino-s-triazine-2,4-diyl)[2,2,6,6-tetramethyl-4-piperidyl]imino]-hexamethylene[(2,2,6,6-tetramethyl-4-piperidyl)imino]] (HALS-2) is be treated with sodium dichloroisocyanurate (DCCANa) to produce Poly [(6-morpholino-s-triazine-2,4-diyl)-N-chloro-[2,2,6,6-tetramethyl-4-piperidyl]imino]-hexamethylene[(2,2,6,6-tetramethyl-4-piperidyl)imino]] (HALS-2-Cl).

Furthermore, FIG. 1 illustrates the recharging of Poly[(6-morpholino-s-triazine-2,4-diyl)[2,2,6,6-tetramethyl-4-piperidyl]imino]-hexamethylene[(2,2,6,6-tetramethyl-4-piperidyl)imino]] to Poly[(6-morpholino-s-triazine-2,4-diyl)-N-chloro-[2,2,6,6-tetramethyl-4-piperidyl]imino]-hexamethylene[(2,2,6,6-tetramethyl-4-piperidyl)imino]] using a source of halides (bleach).

Antimicrobial properties of the synthesized SHCs. The bacteria used in this study are as follows: *Escherichia coli*, gram-negative, ATCC 15597; *Staphylococcus aureus*, gram-positive, ATCC 6538; *Escherichia coli*, gram-negative, resistant to sulfonamide, ATCC 29214; and *Staphylococcus aureus* subsp. *aureus*, gram-positive, resistant to tetracycline, penicillin, streptomycin, and erythromycin and ATCC 14154. Although, the skilled artisan will recognize that other bacteria may be treated with the present invention.

Antimicrobial Procedure: SHC samples were crushed into powders. A standard sieve was used to collect the powders in the 60-80 mesh (about 0.42-0.31 mm) range. One gram of each sample was packed into a column (I.D.: about 6 mm). About 1 ml of an aqueous suspension containing about $10^{6-7}$ CFU/mL (colony forming units per milliliter) of the bacteria was passed through the columns containing the corresponding samples. The flow rate was controlled by compressed air (about 0.1-10 ml/min). The effluent was collected, serially diluted, and each dilution was placed onto nutrient agar plates. The same procedure was also applied to the un-chlorinated SHAs powders as control. Bacterial colonies on plates were counted after incubation at about 37° C. for about 24 hours. No bacteria growth was observed on the agar plates after about 24 hours of incubation, i.e. the Sterically Hindered N-Halo-amines provided total kill of the microorganisms under the test conditions mentioned above.

Durability and Rechargeability of the SHCs. Durability: After storage under ambient conditions (e.g., temperature about 25° C.±3, humidity about 60±10%) for a certain period of time, the active chlorine contents in the SHC samples were titrated and the results were listed in Table 3.

TABLE 3

| | Active chlorine content, wt. % | | |
|---|---|---|---|
| | 2 month | 4 month | 6 month |
| SHC-1 | 12.6 | 12.8 | 12.4 |
| SHC-2 | 8.70 | 8.60 | 8.54 |
| SHC-3 | 8.10 | 7.70 | 7.30 |
| SHC-4 | 10.2 | 10.5 | 10.0 |

Rechargeability: The SHC powders were neutralized by immersing in about 0.1 mol/L sodium thiosulfate solution at room temperature under shaking for about 30 minutes, and then chlorinated according to the synthesis procedures mentioned above. After each chlorination, the samples were washed thoroughly with a large amount of distilled water. The active chlorine contents of the SHC samples after about 50 cycles of "neutralization-chlorination" treatment were essentially unchanged.

Preparation and antimicrobial activities of commercially important polymers containing Sterically Hindered N-Halo-amines. To incorporate SHCs into commercially important polymeric materials, two methods were developed. In the first method, SHA samples were added into polymeric materials by conventional processing technologies including extrusion, injection molding, thermal pressing, coating, painting or solvent casting. Then, the SHA-containing samples were halogenated to transfer SHAs into SHHs. In the second method, SHAs were first transferred into SHHs and then incorporated into commercially important polymers by extrusion, injection molding, thermal pressing, coating, painting or solvent casting. Both methods are feasible approaches to incorporate SHHs into polymeric materials and the resultant polymeric materials demonstrated potent, durable and rechargeable antimicrobial activities.

Preparation of antimicrobial polymeric materials using the first method disclosed hereinabove and the antimicrobial activities of the resultant polymers. Incorporating SHAs into polymers: The additives of the present invention were formed into polymers by extrusion, injection molding, coating, painting, hot pressing and solvent casting; typical examples are described below:

Extrusion: Polymer films-Polymer pellets and SHA powders (about 0.01-30 wt % of the polymers) were extruded as films of about 400-500 μm thickness from a Laboratory Mixing Extruder. The temperatures of the barrel and the die were kept at about 120-200 and about 160-200° C. respectively. Extrusion: Polymer tubes-Polymer pellets and SHA powders (about 0.01-30 wt % of the polymers) were extruded as a tube (I.D.: about 3 mm, E.D.: about 5 mm) from the Laboratory Mixing Extruder. The temperatures of the barrel and the die were kept at 120-200 and 160-200° C., respectively. Extrusion: Fibers-Polymer pellets and SHA powders (about 0.01-30 wt % of the polymers) were extruded as fibers from the Laboratory Mixing Extruder. The temperatures of the barrel and the die were kept at about 120-200 and about 160-200° C., respectively.

Injection molding: Polymer sheets-Polymer pellets and SHA powders (about 0.01-30 wt % of the polymers) were mixed, homogenized and then injection molded into a sheet of about 1 mm thickness. The machine used was a Minimax Laboratory Molder (e.g., equipment with a test mould). The temperature of the mixing cup was about 120-200° C. Test mould was kept at ambient temperature.

Hot pressing: Polymer films-Polymer pellets and SHA powders (about 0.01-30 wt % of the polymers) were mixed and homogenized on a Minimax Laboratory Molder at about 120-200° C. Then the blended materials were hot pressed into about a 300 μm thickness film at about 120-200° C. using a hot press.

Solvent casting/painting/coating: Polymeric materials and SHA powders (about 0.01-30 wt % of the polymers) were dissolved in chloroform, acetone, THF, DMF, or DMSO. The solution was cast, sprayed or brushed onto any surfaces. After evaporation of the solvent, films, paintings or coatings are obtained.

Described below are examples to make the SHA-Containing polymer articles.

EXAMPLE 5

Making SHA-containing PP Tubes. about 20 grams of PP pellets and about 0.8 grams SHA-3 powders (about 4 wt % of PP) were mechanically mixed and then extruded as a tube (I.D.: about 3 mm, E.D.: about 5 mm) from the Laboratory Mixing Extruder. The temperatures of the barrel and the die were kept at about 160 and 180° C. respectively. The extruded PP tube from the die of the extruder was under the traction of the CSI-194T Take Up Apparatus.

EXAMPLE 6

Making SHA-containing PE sheets. about 10 grams of PE pellets and about 0.02 grams of SHA-2 powders (about 0.2 wt % of PE) were mixed, homogenized for 5 min, and then injection molded into a sheet of 1 mm thickness. The machine used was a Minimax Laboratory Molder equipment with a test mould. The temperature of the mixing cup was about 160° C. Test mould was kept at ambient temperature.

EXAMPLE 7

Making SHA-containing PP films. About 20 grams of PP pellets and 0.4 grams of SHA-1 powders (about 2 wt % of PP) were mixed and homogenized on a Minimax Laboratory Molder at about 180° C. for about 5 minutes. Then the blended materials were hot pressed into about a 300 μm thickness film at about 180° C. for about 30 seconds using a hot press.

EXAMPLE 8

Solvent casting SHA-containing PS films. To about 70 ml chloroform containing about 7 grams PS pellets was added about 0.42 grams SHA-4 powders (about 6 wt % of PS), and then vigorously stirred. The sample solution was cast onto a clean glass surface. The PS films of about 200 μm thickness were formed after evaporation of solvent over night.

Transformation of SHA-containing plastics into SHC-containing plastics: The additives of the present invention were formed into polymers by extrusion, injection molding, hot pressing and solvent casting/coating/painting as described hereinabove.

General halogenation procedures: All SHA-containing polymer samples (e.g., films, sheets, fibers and tubes) were chlorinated with a diluted household bleach (e.g., Clorox) containing about 0.6% sodium hypochlorite under constant shaking. The pH values were in the range of about 7 to about 12 and the chlorination time was in the range of about 10 minutes to about 4 hours. After chlorination, the samples were thoroughly washed with large amount of distilled water to remove free chlorine (e.g., the washing water was checked with chlorine strips with about 0.5 ppm of accuracy).

EXAMPLE 9

PP extruded tubes containing about 4 wt % SHA-3 were chlorinated with a diluted household bleach (e.g., Clorox) containing about 0.6% sodium hypochlorite under constant shaking. The pH value and the chlorination time were kept at about 7.0 and about 1 hour, respectively. After chlorination, the PP tubes were thoroughly washed with a large amount of distilled water to remove free chlorine. The active chlorine content in the sample was about 159 ppm/gram determined by titration with 0.001 sodium thiosulfate solution.

EXAMPLE 10

PE injection molded sheets containing about 0.2 wt % SHA-2 were chlorinated with a diluted household bleach containing about 0.6% sodium hypochlorite under constant shaking. The pH value and the chlorination time were kept at about 9.0 and about 2 hours, respectively. After chlorination, the PE sheets were thoroughly washed with a large amount of distilled water to remove free chlorine. The active chlorine content in sample was about 120 ppm/gram determined by titration with about 0.001 sodium thiosulfate solution.

EXAMPLE 11

PP hot pressing films containing about 2 wt % SHA-1 were chlorinated with a diluted household bleach (e.g., Clorox) containing about 0.6% sodium hypochlorite under constant shaking. The pH value and the chlorination time were kept at about 11 and about 4 hours, respectively. After chlorination, the PP films were thoroughly washed with a large amount of distilled water to remove free chlorine. The active chlorine content in sample was about 274 ppm/grams determined by titration with 0.001 sodium thiosulfate solution.

EXAMPLE 12

PS solvent casting films containing about 6 wt % SHA-4 were chlorinated with a diluted household bleach (e.g., Clorox) containing about 0.6% sodium hypochlorite under constant shaking. The pH value and the chlorination time were kept at about 7.0 and about 4 hours, respectively. After chlorination, the PS films were thoroughly washed with a large amount of distilled water to remove free chlorine. The active chlorine content in samples was about 394 ppm/gram determined by titration with about 0.001 sodium thiosulfate solution.

Antimicrobial activity of the SHC-containing materials as described hereinabove: The polymeric materials were tested for antimicrobial properties using the following bacteria: *Escherichia coli*, gram-negative, ATCC 15597; *Staphylococcus aureus*, gram-positive, ATCC 6538; *Escherichia coli*, gram-negative, resistant to sulfonamide, ATCC 29214; and *Staphylococcus aureus* subsp. *aureus*, gram-positive, resistant to tetracycline, penicillin, streptomycin, and erythromycin, ATCC 14154.

General Procedures: about 10 μL of an aqueous suspension containing about $10^{6-7}$ CFU/mL bacteria was placed onto the surfaces of the polymeric materials. After different contact time, the polymeric materials were transferred into about 100 mL of about 0.03 wt % sodium thiosulfate aqueous solution. The resultant solution was vigorously shaken for about 5 minutes. An aliquot of the solution was serially diluted, and 100 μL of each dilution was placed onto nutrient agar plates. The same procedure was also applied to an un-chlorinated sample as a control. Viable bacterial colonies on the agar plates were counted after incubation at about 37° C. for about 24 hours.

EXAMPLE 13

About 100 μL of an aqueous suspension containing about $10^{6-7}$ CFU/mL of the bacteria were dropped into the chlorinated PP extruded tube, whose bottom was sealed. The tube was shaken for a certain period of time. Then, the tube was put into about 100 mL of about 0.03 wt % sodium thiosulfate aqueous solution. The resultant solution was vigorously shaken for about 5 minutes. An aliquot of the solution was serially diluted, and about 100 μL of each dilution was placed onto nutrient agar plates. The same procedure was also applied to an un-chlorinated sample as a control. Viable bacterial colonies on the agar plates were counted after incubation at about 37° C. for about 24 hours.

PP extruded tube containing about 159 ppm/gram of active chlorine inactivated about 90% of all the tested bacteria in a contact time of about 10 minutes. After about 60 min of contact time, the same tube provided total kill of the bacteria.

EXAMPLE 14

About 10 μL of an aqueous suspension containing about $10^{6-7}$ CFU/mL bacteria was placed onto the surface of the chlorinated PE injection molded sheet (about 2×2 cm$^2$), and the sheet was covered with another identical sheet. After different contact time, the sheets were transferred into about 100 mL of about 0.03 wt % sodium thiosulfate aqueous solution. The resultant solution was vigorously shaken for about 5 minutes. An aliquot of the solution was serially diluted and about 100 µL of each dilution was placed onto nutrient agar plates. The same procedure was also applied to an un-chlorinated sample as a control. Viable bacterial colonies on the agar plates were counted after incubation at about 37° C. for about 24 hours.

PE injection molded sheet containing about 120 ppm/gram of active chlorine inactivated about 99.99% of all the tested bacteria in a contact time of less than about 30 seconds. After about 5 minutes of contact time, the same sheet provided total kill of the bacteria.

EXAMPLE 15

About 10 µL of an aqueous suspension containing about $10^{6-7}$ CFU/mL bacteria was placed onto the surface of the chlorinated PP hot pressed film (about 2×2 cm$^2$), and the film was covered with another identical film. After different contact time, the film was transferred into about 100 mL of about 0.03 wt % sodium thiosulfate aqueous solution. The resultant solution was vigorously shaken for about 5 minutes. An aliquot of the solution was serially diluted and about 100 µL of each dilution was placed onto nutrient agar plates. The same procedure was also applied to an un-chlorinated sample as a control. Viable bacterial colonies on the agar plates were counted after incubation at about 37° C. for about 24 hours.

PP hot pressed film containing about 274 ppm/gram of active chlorine inactivated about 99.99% of all the tested bacteria in a contact time of less than about 1 minute. After about 5 minutes of contact time, the same film provided total kill of the bacteria.

EXAMPLE 16

About 10 µl of an aqueous suspension containing about $10^{6-7}$ CFU/mL bacteria was placed onto the surface of the chlorinated PS solvent casting film, and the film was covered with another identical film. After different contact time, the film was transferred into about 100 mL of about 0.03 wt % sodium thiosulfate aqueous solution. The resultant solution was vigorously shaken for about 5 minutes. An aliquot of the solution was serially diluted and about 100 µL of each dilution was placed onto nutrient agar plates. The same procedure was also applied to an un-chlorinated sample as a control. Viable bacterial colonies on the agar plates were counted after incubation at about 37° C. for about 24 hours.

PS solvent casting films containing about 394 ppm/gram of active chlorine inactivated about 99.99% of all the tested bacteria in a contact time of about 15 seconds. After about 3 minutes, the same films killed all the challenging cells.

Durability and rechargeability of the antimicrobial activities: All polymer samples (e.g., films, sheets, fibers, coatings, paints and tubes) were stored under ambient conditions (e.g., temperature: e.g., 25° C.±3, humidity: e.g., 60±10%). The active chlorine content in sample was determined by titration at intervals of about 2, 4 and 6 months. For all polymer samples, the active chlorine content was unchanged within 6 months. Two typical examples were listed in Table 4.

TABLE 4

Active chlorine contents of PP and PE films during storage.

| Sample | Active chlorine content (ppm/g) | | | |
|---|---|---|---|---|
| | As prepared | 2 months | 4 months | 6 months |
| PP hot pressed film (2 wt % SHA-1) | 274 | 247 | 247 | 254 |
| PS solvent casting film (6 wt % SHA-4) | 394 | 386 | 396 | 390 |

Rechargeability: Chlorinated polymer samples were treated in about 0.1 mol/L sodium thiosulfate solution at room temperature for about 30 minutes under constant shaking. After treatment, the samples were thoroughly washed with distilled water, and then bleached again according to the procedure described hereinabove. After each chlorination, the samples were washed thoroughly with a large amount of distilled water. The active chlorine contents of the samples after about 50 cycles of "neutralization-chlorination" treatments were essentially unchanged.

Preparation of antimicrobial polymeric materials using the second method and the antimicrobial activities of the resultant polymers. Synthesis of the Sterically Hindered N-Haloamines, e.g. Sterically Hindered Chloramines: Structures of SHC-1, SHC-2, SHC-3 and SHC-4 are shown in Table 2. They were prepared according to the methods described hereinabove in Examples 1-4.

Incorporating SHCs into polymers: Extrusion: Polymer tubes-Polymer pellets and SHC powders (about 0.01-30 wt % of the polymers) were extruded as tubes (I.D.: about 3 mm, O.D.: about 5 mm) from the Laboratory Mixing Extruder. The temperatures of the barrel and the die were kept at about 120-200 and about 140-200° C., respectively.

Extrusion: Fibers-Polymer pellets and SHC powders (about 0.01-30 wt % of the polymers) were extruded as fibers from the Laboratory Mixing Extruder. The temperatures of the barrel and the die were kept at about 120-200 and about 160-200° C., respectively.

Injection molding: Polymer sheets-Polymer pellets and SHC powders (about 0.01-30 wt % of the polymers) were mixed, homogenized and then injection molded into a sheet of 1 mm thickness. The machine used was a Minimax Laboratory Molder equipment with a test mould. The temperature of the mixing cup was about 120-200° C. Test mould was kept at ambient temperature.

Hot pressing: Polymer films-Polymer pellets and SHC powders (about 0.01-30 wt % of the polymers) were mixed and homogenized on a Minimax Laboratory Molder at about 120-200° C. Then the blended materials were hot pressed into a 300 µm thickness film at about 120-200° C. using a hot press.

Solvent casting/painting/coating: Polymer pellets and SHC powders (about 0.01-30 wt % of polymers) were dissolved in acetone, chloroform, THF, DMF or DMSO. The solution was cast, sprayed or brushed onto any surfaces. After evaporation of the solvent, films, coatings or paints were obtained.

EXAMPLE 17

Making SHC-containing PP tubes. About 20 grams of PP pellets and about 0.8 grams SHC-3 powders (about 4 wt % of PP) were mechanically mixed and then extruded as a tube (I.D.: about 3 mm, E.D.: about 5 mm) from the Laboratory Mixing Extruder. The temperatures of the barrel and the die were kept at about 150 and 160° C. respectively. The extruded PP tube from the die of the extruder was under the traction of a Take Up Apparatus. The active chlorine content in samples was about 105 ppm/gram determined by titration with about 0.001 sodium thiosulphate solution.

EXAMPLE 18

Making SHC-containing PE sheets. About 10 grams of PE pellets and about 0.02 grams of SHC-2 powders (about 0.2 wt % of PE) were mixed, homogenized for about 2 minutes and then injection molded into a sheet of about 1 mm thickness. The machine used was a Minimax Laboratory Molder equipment with a test mould. The temperature of the mixing cup was about 145° C. Test mould was kept at ambient temperature. The active chlorine content in samples was about 88 ppm/gram determined by titration with about 0.001 sodium thiosulphate solution.

EXAMPLE 19

Making SHC-containing PP Films. About 20 gram of PP pellets and about 0.4 gram of SHC-1 powders (about 2 wt % of PP) were mixed and homogenized on a Minimax Laboratory Molder at about 165° C. for 2 minutes. Then the blended materials were hot pressed into a 300 μm thickness film at about 165° C. for 10 seconds using a hot press. The active chlorine content in samples was about 196 ppm/gram determined by titration with 0.001 sodium thiosulphate solution.

EXAMPLE 20

Solvent casting SHC-containing PS Films. To about 70 ml chloroform containing about 7 gram PS pellets was added about 0.42 gram SHC-4 powders (about 6 wt % of PS), and then vigorously stirred. The sample solution was cast onto a clean glass surface. The PS films of about 200 μm thickness were formed after evaporation of solvent over night. The active chlorine content in samples was about 315 ppm/gram determined by titration with about 0.001 sodium thiosulphate solution.

Antimicrobial activity of the SHC-containing materials as described hereinabove.

The polymers were tested for antimicrobial properties using the following bacteria: *Escherichia coli*, gram-negative, ATCC 15597; *Staphylococcus aureus*, gram-positive, ATCC 6538; *Escherichia coli*, gram-negative, resistant to sulfonamide, ATCC 29214; and *Staphylococcus aureus* subsp. *aureus*, gram-positive, resistant to tetracycline, penicillin, streptomycin, and erythromycin and ATCC 14154.

General Procedures: About 10 μL of an aqueous suspension containing about $10^{6-7}$ CFU/mL bacteria was placed onto the surfaces of the polymeric materials. After different contact time, the polymeric materials were transferred into about 100 mL of about 0.03 wt % sodium thiosulfate aqueous solution. The resultant solution was vigorously shaken for about 5 minutes. An aliquot of the solution was serially diluted, and about 100 μL of each dilution was placed onto nutrient agar plates. The same procedure was also applied to an un-chlorinated sample as a control. Viable bacterial colonies on the agar plates were counted after incubation at about 37° C. for about 24 hours.

EXAMPLE 21

About 10 μL of an aqueous suspension containing about $10^{6-7}$ CFU/mL bacteria was dropped into the chlorinated PP extruded tube, whose bottom end was sealed. The tube was constantly shaken for a certain period of time. Then, the tube was transferred into about 100 mL of about 0.03 wt % sodium thiosulfate aqueous solution. The resultant solution was vigorously shaken for about 5 minutes. An aliquot of the solution was serially diluted and about 100 μL of each dilution was placed onto nutrient agar plates. The same procedure was also applied to an un-chlorinated sample as a control. Viable bacterial colonies on the agar plates were counted after incubation at about 37° C. for about 24 hours.

PP extruded tube containing about 105 ppm/gram of active chlorine inactivated about 90% of all the tested bacteria in a contact time of about 15 minutes. After about 120 minutes of contact time, the same tube provided total kill of the bacteria.

EXAMPLE 22

About 10 μL of an aqueous suspension containing about $10^{6-7}$ CFU/mL bacteria was placed onto the surface of the chlorinated PE injection molded sheet (about 2×2 cm$^2$), and the sheet was covered with another identical sheet. After different contact time, the sheets were transferred into about 100 mL of 0.03 wt % sodium thiosulfate aqueous solution. The resultant solution was vigorously shaken for about 5 minutes. An aliquot of the solution was serially diluted and about 100 μL of each dilution was placed onto nutrient agar plates. The same procedure was also applied to an un-chlorinated sample as a control. Viable bacterial colonies on the agar plates were counted after incubation at about 37° C. for about 24 hours.

PE injection molded sheet containing about 88 ppm/gram of active chlorine inactivated about 99.99% of all the tested bacteria in a contact time of less than about 5 minutes. After about 15 minutes of contact time, the same sheet provided total kill of the bacteria.

EXAMPLE 23

About 10 μL of an aqueous suspension containing about $10^{6-7}$ CFU/mL bacteria was placed onto the surface of the chlorinated PP hot pressed film (about 2×2 cm$^2$), and the film was covered with another identical film. After different contact time, the films were transferred into about 100 mL of about 0.03 wt % sodium thiosulfate aqueous solution. The resultant solution was vigorously shaken for about 5 minutes. An aliquot of the solution was serially diluted and about 100 μL of each dilution was placed onto nutrient agar plates. The same procedure was also applied to an un-chlorinated sample as a control. Viable bacterial colonies on the agar plates were counted after incubation at about 37° C. for about 24 hours.

PP hot pressed film containing about 196 ppm/gram of active chlorine inactivated about 99.9% of all the tested bacteria in a contact time of less than about 1 minute. After about 10 minutes of contact time, the same film provided total kill of the bacteria.

EXAMPLE 24

About 10 μL of an aqueous suspension containing about $10^{6-7}$ CFU/mL bacteria was placed onto the surface of the chlorinated PS solvent casting film, and the film was covered with another identical film. After different contact time, the films were transferred into about 100 mL of about 0.03 wt % sodium thiosulfate aqueous solution. The resultant solution was vigorously shaken for about 5 minutes. An aliquot of the solution was serially diluted and about 100 μL of each dilution was placed onto nutrient agar plates. The same procedure was also applied to an un-chlorinated sample as a control. Viable bacterial colonies on the agar plates were counted after incubation at about 37° C. for about 24 hours.

PS solvent casting films containing about 315 ppm/gram of active chlorine inactivated about 99.99% of all the tested bacteria in a contact time of about 1 minute. After about 5 minutes, all the challenging cells were killed.

Durability: All polymer samples (e.g., films, sheets, fibers, paints, coating, and tubes) were stored under ambient conditions (temperature: about 25° C.±3, humidity: about 60±10%). The active chlorine content in sample was determined by titration at intervals of 2, 4 and 6 months. For all polymer samples, the active chlorine content was unchanged within 6 months. Two typical examples were listed in Table 5.

TABLE 5

Active chlorine contents of PP and PE films during storage.

| | Active chlorine content (ppm/g) | | | |
|---|---|---|---|---|
| Sample | As prepared | 2 months | 4 months | 6 months |
| PP hot pressed film (2 wt % SHC-1) | 196 | 200 | 187 | 190 |
| PS solvent casting film (6 wt % SHC-4) | 315 | 302 | 298 | 290 |

Rechargeability: Chlorinated polymer samples (e.g., films, sheets, coating, paints, and tubes) were treated in about 0.1 mol/L sodium thiosulfate solution at room temperature for about 30 minutes under constant shaking. After treatment, the samples were thoroughly washed with distilled water, and then bleached again according to the procedure described above. After each chlorination the samples were washed thoroughly with a large amount of distilled water. The active chlorine contents of the samples after about 50 cycles of "neutralization-chlorination" treatments were essentially unchanged.

Generally, the Hindered Amine Light Stabilizers (HALS) or Hindered Amine Stabilizers (HAS) of the present invention may be a portion of a larger compound (e.g., a monomer of a polymer) and contain a sterically hindered piperidine structure as shown below:

where $R_1$ is one of halogen, hydrogen, hydroxyl, straight chain or branched alkyl, straight chain or branched alkoxy, aryl, arylalkyl, cycloalkyl, cycloalkoxy and combinations thereof and where $R_2$ is one of aliphatic amine, aliphatic diamine, aromatic amine, straight chain or branched alkyl, aliphatic ester, cycloalkyl and combinations thereof. Furthermore $R_2$ may be a linker to connect two or more Hindered Amine Light Stabilizers or Hindered Amine Stabilizers containing a straight chain or branched alkyl, straight chain or branched alkoxy, aryl, arylalkyl, cycloalkyl, cycloalko, aliphatic ester, aliphatic amine, aromatic amine and combinations thereof.

In addition, $R_1$ and $R_2$ may individually be an acyl, alkyl, alkylene, alkoxy, alkylamino, alkylthio, aryl, cycloalkyl, halogen, haloalkyl, heteroalkyl, heteroalkylene, heterocycloalkyl and combinations thereof. Furthermore, the compound may be substituted with an acyl, alkyl, alkylene, alkoxy, alkylamino, alkylthio, aryl, cycloalkyl, halogen, haloalkyl, heteroalkyl, heteroalkylene, heterocycloalkyl and combinations thereof. For example, 2,2,6,6-tetramethyl-N-chloro-4-piperidinyl structure, which may be polymerizable. Additionally, monomeric and oligomeric forms of these additives include, but are not limited to: 3-dodecyl-1-(1,2,2,6,6-pentamethyl-4-piperidyl)-pyrrolidine-2,5-dione, 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 8-acetyl-3-dodecyl-7,7,9,9-tetramethyl-1,3,8-triazaspiro [4.5]decane-2,4-dione, 3-dodecyl-1-(2,2,6,6-tetramethyl-4-piperidyl)pyrrolidine-2,5-dione, bis(2,2,6,6-tetramethyl-4-piperidyl)sebacate, bis(2,2,6,6-tetramethyl-4-piperidyl) succinate, bis(1,2,2,6,6-pentamethyl-4-piperidyl)sebacate, bis(1-octyloxy-2,2,6,6-tetramethyl-4-piperidyl)sebacate, bis (1,2,2,6,6-pentamethyl-4-piperidyl)n-butyl-3,5-di-tert-butyl-4-hydroxybenzylmalonate, bis(1-octyloxy-2,2,6,6-tetramethylpiperidyl)sebacate, bis(1-octyloxy-2,2,6,6-tetramethylpiperidyl)succinate, N-(2,2,6,6-tetramethyl-4-piperidyl)-n-dodecylsuccinimide, N-(1,2,2,6,6-pentamethyl-4-piperidyl)-n-dodecylsuccinimide, tris(2,2,6,6-tetramethyl-4-piperidyl)nitrilotriacetate and tetrakis(2,2,6,6-tetramethyl-4-piperidyl)-1,2,3,4-butanetetracarboxylate.

The applications for the present invention cover a spectrum of products, from healthcare professional uses to the broader areas of sanitation, infection and odor control in military and institutional hygienic practices. The present invention also includes consumer uses especially in the hospitality industry, athletic wear and sports facilities sectors. These uses are fueled in recent times by an explosion of concern about new infectious disease problems, such as HIV/AIDS and avian influenza, the growing risk from antibiotic-resistant bacteria such as MRSA and VRE, and the age-old problems of hepatitis, tuberculosis and *E. coli*.

For example, public awareness and institutional costs of hospital-acquired infections is fueling the search for better products. Food industries have become acutely aware of the risks from various bacteria such as the deadly *E. coli* O157: H7. The food industry has also become increasingly vulnerable to liability with the advent of better detection methods that can now trace food illness back to its source. The world's militaries have never solved the problem of fungal growth (e.g., "jungle rot") for soldiers on patrol that must wear their clothes for long periods between launderings. Fungal growth can result in discomfort and infection leading to a loss of manpower.

The plastics and fabrics made using the present invention are anti-bacterial, anti-viral, anti-fungal and anti-odor with activity greater than silver-impregnated plastics and fabrics, the next-best approach. The present invention includes plastic parts, films, tubing, cotton and synthetic fabrics and antimicrobial plastic additive that are antimicrobial in nature. The plastic additive is compatible with standard plastics including PET, polyethylene, PVC, polypropylene, and polystyrene. Fiber and fabric manufacturers can use the plastic additive without altering their normal fiber extrusion process. Polyester, nylon, and polypropylene fabrics can now be made permanently antimicrobial.

Additionally, low-melt-temperature plastics such as polystyrene, PVC and Polyethylene can be pre-chlorinated by adding the present invention to plastics to include non-woven fabrics, e.g., masks, wipes, shoe and head covers, diapers, wound care, and disposable healthcare fabrics, disposable medical plastics and packaging e.g., medical packaging to ensure sterility, food packaging to protect against bacteria, anti-mold packaging to extend shelf-life. Additional applications of the present invention are listed in Tables 6 and 7 below.

TABLE 6

| Antimicrobial Plastic Additive | Product Examples |
|---|---|
| Carpet and Upholstery | Healthcare carpeting. Anti-infection (e.g., bacteria, viruses, and funguses). Anti-odor. Consumer carpeting for pet owners. |
| Cleaning Tools | Consumer, healthcare, dental, food service, food factory. Rags. Mops. Sponges. Disposables, non-woven wipes, etc. Toothbrushes. |
| Gloves | Anti-infection, anti-cross contamination gloves for healthcare, food factory, food service. Nitrile. Vinyl. Knit. |
| Medical Nonwovens (garments/masks) | Develop antibacterial, antiviral nonwoven products (e.g., disposable and reusable) for healthcare, food factory, food service, first responders (e.g., medics, firefighters) and military (e.g., anti-germ warfare). Antiviral masks. Wound dressings. Patient and staff apparel (e.g., scrub apparel and patient gowns). Tapes and electrodes. Filter media. Hot/cold therapy bags. Stretcher covers. Shoe & head covers. Isolation gowns. Fabrics for wound dressings, prep pads, finger bandages, operation swabs, medical tape base, medical wipes, hospital bed linens and ostomy bags. Disposable absorbent pads (e.g., medical underpads for nursing homes and operating rooms, ambulance floor pads, trauma pads for bodily contact, lab bench pads, transportation containment pouches, etc. |
| Water/Air Filtration | Anti-slime filters, e.g., pools and spas. Healthcare filtration, e.g., anti-slime filters in dialysis machines, endoscope cleaning machines, etc. Drinking water purification and storage. Industrial water treatment. Consumer, industrial and healthcare air filtration. |
| Food Processing/ manufacturing | Cross-contamination protection. Floor and wall sealing systems. Uniforms and gloves. Conveyor belts. Cutting boards. Food film covering. |
| Paints and Coatings | Paints. Film covering. Stains. |
| Medical Devices | Catheters (e.g., venous, urinary, tracheal, dialysis). Instruments (e.g., stethoscopes, blood pressure cuffs). Patient touch surfaces (e.g., mattresses, bed railings, slings, bathroom surfaces). |
| Wound Care and Chronic Skin Infections | Pads. Sponges. Bandages. Burns. Chronic Wound. Dermal Lesions. Diabetic Neuropathic Foot Ulcer. Edema. First and Second-Degree Burns. Infected Wound. |

TABLE 6-continued

| Antimicrobial Plastic Additive | Product Examples |
|---|---|
| | Necrotic Wound. Neuropathic Ulcer. Skin at Risk from Radiation Complications, Excess Moisture, Skin Grafts, Stage I, II, III, IV Pressure Ulcers, Surgical Incisions. |
| Packaging | Medical packaging to ensure sterility. Food packaging to protect against bacteria. Anti-mold packaging to extend shelf-life. |

TABLE 7

| Antimicrobial Textiles | Product Examples |
|---|---|
| Medical Textiles | Reusable healthcare textiles for acute care, long-term care, dental industries to provide infection protection against microbes including bacteria, viruses, and funguses. Sheets and pillow cases. Patient wear. Uniforms for nurses, doctors, cleaning staff, dentists. Privacy curtains. Toweling. Fabric laminations (e.g., film, net and adhesive). Incontinence products (e.g., bed pads and patient wear). Antiviral woven reusable masks (e.g., Avian Influenza). Medical barriers. |
| Military Textiles | Underwear and socks. Battle dress uniforms. Anti-germ warfare uniforms. |
| Apparel and linen | Fitness club members, Sports Leagues, Hotels, Gaming Casinos, Linens and uniforms for food service operations, food factories, and prison inmates. Outer wear, socks, underwear. Outdoor and hunting apparel. Footwear (anti-odor and anti-fungal). |
| Medicated Products | Medicated socks and underwear. Wound care. |
| Consumer Disposable Non-Wovens | Adult incontinence disposable diapers (e.g., anti-odor). Baby diapers (e.g., anti-diaper rash). Feminine hygiene products (e.g., tampons, pads). Home wipers for cleaning. |
| Building Products | Biofilm remediation for plastic tubing and pipe applications in these markets: potable water storage, PVC potable water plumbing and piping in chlorinated systems (e.g., municipal and construction), medical tubing, dental tubing, manufacturing process water. Anti-mold grout and caulk. Anti-mold wall board. Countertops and flooring. Anti-mold, antimicrobial paints and coatings. Low-cost water purification (low chlorine, antiviral). Safe water storage (e.g., many uses such as the roof-top tanks ubiquitous in many parts of the world). Military coatings. |

The resultant polymeric materials of the present invention demonstrate potent antimicrobial and/or disinfectant activities against a variety of pathogens including bacteria, virus (e.g., retrovirus, herpesvirus, adenovirus, lentivirus, etc.), spores, fungi, bacteria phage and combinations thereof.

Further examples of Bacteria includes but is not limited to *Staphylococcus aureus* (Staph), *Salmonella choleraesuis,*

*Pseudomonas aeruginosa, Streptococcus pyogenes* (Strep), *Escherichia coli* 0157:H7 (*E. coli*), *Shigella dysenteriae* and combinations thereof.

Further examples of viruses include but are not limited to polio virus, TT virus, herpes virus, hepatitis virus, or human immunodeficiency virus (HIV), HCV, HAV, HIV-1, HIV-2, HHV-6, HSV-1, HSV-2, CMV, EBV, rotavirus, adenoviruses, respiratory syncytial virus, Cytomegalovirus, parvovirus, Ebola virus, Varicella-zoster virus, poliovirus, Dengue virus, Haemophilus influenza, Influenza, Mycobacterium bovis (Tuberculosis), Rotavirus, Rubella virus, Rhinovirus (Cold virus), measles virus, mumps virus, influenza viruses and combinations thereof.

Further examples of Fungi include but not limited to *Candida albicans, Aspergillus, Blastomyces, Coccidioides, Cryptococcus, Epidermophyton, Histoplasma, Mucorales, Microsporum, Paracoccidioides brasiliensis, Sporothrix schenckii, Trichophyton, Trichophyton mentagrophytes* and combinations thereof. In addition the present invention may be used to remove odors through antimicrobial and/or disinfectant activities against a variety of odor causing pathogens.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES (1) Binder, S.; Levitt, A. M.; Sacks, J. J.; Hughes, J. M. Science 1999, 284, 1311-1313.
(2) Worley, S. D.; Sun, G. Trends Polym. Sci. 1996, 4, 364-370.
(3) Tiller, J. C.; Liao, C.; Lewis, K.; Klibanov, A. M. Proc. Natl. Acad. Sci. USA. 2001, 98, 5981-5985.
(4) Lee, S. B.; Koepsel, R. R.; Morley, S. W.; Matyjaszewski, K.; Sun, Y.; Russell, A. J.; Biomacromolecules, 2004, 5, 877-882.
(5) Chen, C. Z.; Beck-Tan, N. C.; Dhurjati, P.; van Dyk, T. K.; LaRossa, R. A.; Cooper, S. L.; Biomacromolecules, 2000, 1, 473-480.
(6) Tew, G. N.; Liu, D.; Chen, B.; Doerksen, R. J.; Kaplan, J.; Carroll, P. J.; Klein, M. L.; DeGrado, W. F. Proc. Natl. Acad. Sci. USA. 2002, 99, 5110-5114.
(7) Albert, M.; Feiertag, P.; Hayn, G.; Saf, R.; Honig, H. Biomacromolecules, 2003, 4, 1811-1817.
(8) Rabea, E. I.; Badawy, M. E. T.; Stevens, C. V.; Smagghe, G.; Steurbaut, W. Biomacromolecules, 2003, 4, 1457-1465.
(9) Muzzarelli, R. A. A.; Muzzarelli, C.; Tarsi, R.; Miliani, M.; Gabbanelli, F.; Cartolari, M. Biomacromolecules, 2001; 2, 165-169.
(10) Braun, M.; Sun, Y. J. Polym. Sci., Part A: Polym. Chem. 2004, 42, 3818-3827.
(11) Sun, Y.; Sun, G. J. Appl. Polym. Sci. 2003, 88, 1032-1039.
(12) Eknoian, M. W.; Putman, J. H.; Worley, S. D. Ind. Eng. Chem. Res. 1998, 37, 2873-2877.
(13) Appendini, P.; Hotchkiss, J. H. Innov. Food Sci. Emerg. Tech. 2002, 3, 113-126.
(14) Plastics additives handbook; Zweifel, H. Ed.; Hanser Gardner Publications: Cincinnati, Ohio, 2001.
(15) Plastic additives and modifiers handbook; Edenbaum, J. Ed.; Van Norstrand Reinhold: New York, 1992.
(16) Plastic additives; Pritchard, G. Ed.; Chapman & Hall: London, 1998.
(17) Stabilization of polymeric materials; Zweifel, H. Ed.; Springer: Berlin, 1998.
(18) Photostabilization of polymers principles and applications; Rabek, J. F. Ed.; Elsevier: New York, 1990.
(19) Bodor, N.; Kaminski, J. J.; Worley, S. D.; Colton, R. J.; Lee, T. H.; Rabalais, J. W. J. Pharm. Sci. 1974, 63, 1387-1391.
(20) Zakrzewski, J. Synth. Commun. 1988, 18, 2135-2140.
(21) Nishimoto, S.; Chaisupakitsin, M.; Inui, T. Radiat. Phys. Chem. 1992, 39, 413-419.
(22) Sun, Y.; Sun, G. Macromolecules 2002, 35, 8909-8912.
(23) Eknoian, M. W.; Putman, J. H.; Worley, S. D. Ind. Eng. Chem. Res. 1998, 37, 2873-2877.

What is claimed is:

1. An antimicrobial polymer additive comprising
a sterically hindered N-halo-amine with a molecular weight higher than 350 g/mol, comprising the moiety of 2,2,6,6-tetramethyl-N-chloro-4-piperidinyl structure.

2. The additive of claim 1, wherein the sterically hindered N-halo-amine selected from the group consisting of:
Bis(N—X-2,2,6,6-tetramethyl-4-piperidyl)sebacate; Poly[[6-[(1,1,3,3 -tetramethylbutyl)amino]-s-triazine-2,4-diyl]-N—X-[(2,2,6,6-tetramethyl-4 -piperidyl)imino]-hexamethylene-[(2,2,6,6-tetramethyl-4-piperidylimino]]; N—X-[(2,2,6, 6-tetramethyl-4-piperidyl)alkyl formate]; Poly[(6-morpholino-s-triazine-2,4-diyl)-N—X-[2, 2,6,6-tetramethyl-4-piperidyl]imino]-hexamethylene[(2,2,6,6-tetramethyl-4 -piperidyl)imino]]; 3-Dodecyl-N—X-(2, 2,6,6-tetramethyl-4-piperidinyl)succinimide; 2,2,4,4-Tetramethyl-N—X-7-oxa-3,20-diazadispiro[5.1.11.2]-heneicosan-21-one; D-Glucitol, 1,3:2,4-bis-O—(N—X-2,2,6,6-tetramethyl-4-piperidinylidene); 1,1'-ethylenebis (N—X-3,3,5,5-tetramethyl-piperazinone); N—X-2,2,4,4-tetramethyl-7-oxa-20-(oxiranylmethyl)-3,20-diazadispiro[5.1.11.2]henicosan-21-one; 1,2,3,4-Butanetetracarboxylic acid, polymer with β,β,β',β'-tetramethyl-2,4,8,10-tetraoxaspiro[5.5]undecane-3,9-diethanol, N—X-2,2,6,6-tetramethyl-4-piperidinyl ester; Poly[oxy[methyl[3-[N—X-(2,2,6,6-tetramethyl4-piperidinyl)-oxy]propyl]silylene]]; 1,1',1"-[1,3,5-Triazine-2,4-6-triyltris[(cyclohexylimino)ethylene]] tris(N—X-3,3,5,5-tetramethyl-piperazinone); and mixtures and combinations thereof, wherein X is Cl or Br or I.

3. The additive of claim 1, wherein the sterically hindered N-halo-amino comprises a source of halides is selected from: sodium di-X-isocyanurate, sodium hypohalite, N—X-succinimide, and calcium hypohalite, wherein X is selected from Cl or Br.

4. The additive of claim 1, wherein the antimicrobial polymer additive is mixed with polymeric materials prior to, during or after halogenation.

5. The additive of claim 1, wherein the antimicrobial polymer additive is antimicrobial against gram-negative bacteria, gram-positive bacteria, species that are drugs resistant and combinations or the thereof.

6. The additive of claim 1, wherein the antimicrobial polymer additive is with a polymer formed by extrusion, injection molding, hot pressing, coating, painting, solvent casting, mixtures and combinations thereof.

7. The additive of claim 1, wherein the polymer is formed into a bead, a film, a tube, a sheet, a thread, a suture, a gauze, a bandage, an adhesive bandage, a vessel, a container, a cistern, a filter, a membrane, a coating, a paint, fibers, yarn and combinations thereof.

8. A method of making an antimicrobial polymer comprising the steps of:
forming a polymer with a sterically hindered amine comprising a ($\beta,\beta,\beta'$, $\beta'$-tetramethyl-4-piperidyl) with a molecular weight of at least 350 g/mol; and
exposing the polymer to a source of halide atoms.

9. The method of claim 8, wherein the sterically hindered amine is selected from: Bis(N—X-2,2,6,6-tetramethyl-4-piperidyl)sebacate; Poly[[6-[(1,1,3,3-tetramethylbutyl)amino]-s-triazine-2,4-diyl]-N—X-[(2,2,6,6-tetramethyl-4-piperidyl)imino]-hexamethylene-[(2,2,6,6-tetramethyl-4-piperidylimino]]; N—X-[(2,2,6,6-tetramethyl-4-piperidyl)alkyl formate]; Poly[(6-morpholino-s-triazine-2,4-diyl)-N—X-[2,2,6,6-tetramethyl-4-piperidyl]imino]-hexamethylene[(2,2,6,6-tetramethyl-4-piperidyl)imino]]; 3-Dodecyl-N—X-(2,2,6,6-tetramethyl-4-piperidinyl)succinimide; 2,2,4,4-Tetramethyl-N—X-7-oxa-3,20-diazadispiro[5.1.11.2]-heneicosan-21-one; D-Glucitol, 1,3:2,4-bis-O—(N—X-2,2,6,6-tetramethyl-4-piperidinylidene); 1,1'-ethylenebis(N—X-3,3,5,5-tetramethyl-piperazinone); N—X-2,2,4,4-tetramethyl-7-oxa-20-(oxiranylmethyl)-3,20-diazadispiro[5.1.11.2]henicosan-21-one; 1,2,3,4-Butanetetracarboxylic acid, polymer with $\beta,\beta,\beta',\beta'$-tetramethyl-2,4,8,10tetraoxaspiro[5.5]undecane-3,9-diethanol, N—X-2,2,6,6-tetramethyl-4-piperidinyl ester; Poly[oxy[methyl[3-[N—X-(2,2,6,6-tetramethyl4-piperidinyl)-oxy]propyl]silylene]]; 1,1',1"-[1,3,5-Triazine-2,4-6-triyltris[(cyclohexylimino)ethylene]]tris(N—X-3,3,5,5-tetramethyl-piperazinone); and mixtures and combinations thereof, wherein X is Cl or Br.

10. The method of claim 8, wherein antimicrobial polymer undergoes recharging by exposing a polymer comprising a sterically hindered amine with a source of halide atoms.

11. The method of claim 8, wherein the source of halides is selected from: sodium di-X-isocyanurate, sodium hypohalite, N—X-succinimide, and calcium hypohalite, wherein X is selected from Cl or Br.

12. The method of claim 8, wherein the antimicrobial polymer additive is antimicrobial against gram-negative bacteria, gram-positive bacteria, species that are drugs resistant and combinations or the thereof.

13. A method of making an antimicrobial polymer comprising the steps of:
mixing a ($\beta,\beta,\beta',\beta'$-tetramethyl-4-piperidyl) sterically hindered amine with a with a molecular weight of at least 350 g/mol with a source of halide atoms to form a sterically hindered N-halo-amine; and
forming a polymer in the presence of the sterically hindered N-halo-amine.

14. The method of claim 13, wherein the ($\beta,\beta,\beta',\beta'$-tetramethyl-4-piperidyl)sterically hindered amine is selected from: Bis(N—X-2,2,6,6-tetramethyl-4-piperidyl)sebacate; Poly[[6-[(1,1,3,3-tetramethylbutyl)amino]-s-triazine-2,4-diyl]-N—X-[(2,2,6,6-tetramethyl-4-piperidyl)imino]-hexamethylene-[(2,2,6,6-tetramethyl-4-piperidylimino]]; N—X-[(2,2,6,6-tetramethyl-4-piperidyl)alkyl formate]; Poly[(6-morpholino-s-triazine-2,4-diyl)-N—X-[2,2,6,6-tetramethyl-4-piperidyl]imino]-hexamethylene[(2,2,6,6-tetramethyl-4-piperidyl)imino]]; 3-Dodecyl-N—X-(2,2,6,6-tetramethyl-4-piperidinyl)succinimide; 2,2,4,4-Tetramethyl-N—X-7-oxa-3,20-diazadispiro[5.1.11.2]-heneicosan-21-one; D-Glucitol, 1,3:2,4-bis-O—(N—X-2,2,6,6-tetramethyl-4-piperidinylidene); 1,1'-ethylenebis(N—X-3,3,5,5-tetramethyl-piperazinone); N—X-2,2,4,4-tetramethyl-7-oxa-20-(oxiranylmethyl)-3,20-diazadispiro[5.1.11.2]henicosan-21-one; 1,2,3,4-Butanetetracarboxylic acid, polymer with $\beta,\beta,\beta',\beta'$-tetramethyl-2,4,8,10-tetraoxaspiro[5.5]undecane-3,9-diethanol, N—X-2,2,6,6-tetramethyl-4-piperidinyl ester; Poly[oxy[methyl[3-[N—X-(2,2,6,6-tetramethyl4-piperidinyl)-oxy]propyl]silylene]]; 1,1',1"-[1,3,5-Triazine-2,4-6-triyltris[(cyclohexylimino)ethylene]]tris(N—X-3,3,5,5-tetramethyl-piperazinone); and mixtures and combinations thereof, wherein X is Cl or Br.

15. The method of claim 13, wherein antimicrobial polymer undergoes recharging by exposing a polymer comprising a sterically hindered amine with a source of halide atoms.

16. The method of claim 13, wherein the source of halides is selected from: sodium di-X-isocyanurate, sodium hypohalite, N—X-succinimide, and calcium hypohalite, wherein X is selected from Cl or Br.

17. The method of claim 13, wherein the antimicrobial polymer additive is antimicrobial against gram-negative bacteria, gram-positive bacteria, species that are drugs resistant and combinations or the thereof.

18. A method of recharging an antimicrobial polymer comprising the steps of:
exposing a polymer comprising a ($\beta,\beta,\beta',\beta'$-tetramethyl-4-piperidyl) sterically hindered amine with a with a molecular weight of at least 350 g/mol with a source of halide atoms.

19. The method of claim 18, wherein the ($\beta,\beta,\beta',\beta'$-tetramethyl-4-piperidyl) sterically hindered amine is selected from: Bis(N—X-2,2,6,6-tetramethyl-4-piperidyl) sebacate; Poly[[6-[(1,1,3,3-tetramethylbutyl)amino]-s-triazine-2,4-diyl]-N—X-[(2,2,6,6-tetramethyl-4-piperidyl)imino]-hexamethylene-[(2,2,6,6-tetramethyl-4-piperidylimino]]; N—X-[(2,2,6,6-tetramethyl-4-piperidyl)alkyl formate]; Poly[(6-morpholino-s-triazine-2,4-diyl)-N—X-[2,2,6,6-tetramethyl-4-piperidyl]imino]-hexamethylene[(2,2,6,6-tetramethyl-4-piperidyl)imino]]; 3-Dodecyl-N—X-(2,2,6,6-tetramethyl-4-piperidinyl)succinimide; 2,2,4,4-Tetramethyl-N—X-7-oxa-3,20-diazadispiro[5.1.11.2]-heneicosan-21-one; D-Glucitol 1,3:2,4-bis-O—(N—X-2,2,6,6-tetramethyl-4-piperidinylidene); 1,1'-ethylenebis(N—X-3,3,5,5-tetramethyl-piperazinone); N—X-2,2,4,4-tetramethyl-7-oxa-20-(oxiranylmethyl)-3,20-diazadispiro[5.1.11.2]henicosan-21-one; 1,2,3,4-Butanetetracarboxylic acid, polymer with $\beta,\beta,\beta',\beta'$-tetramethyl-2,4,8,10-tetraoxaspiro[5.5]undecane-3,9- diethanol, N—X-2,2,6,6-tetramethyl-4-piperidinyl ester; Poly[oxy[methyl[3-[N—X-(2,2,6,6-tetramethyl4-piperidinyl)-oxy]propyl]silylene]]; 1,1',1"-[1,3,5-Triazine-2,4-6-triyltris[(cyclohexylimino)ethylene]]tris(N—X-3,3,5,5-tetramethyl-piperazinone); and mixtures and combinations thereof, wherein X is Cl or Br.

20. The method of claim 18, wherein the source of halides is selected from: sodium di-X-isocyanurate, sodium hypohalite, N—X-succinimide, and calcium hypohalite, wherein X is selected from Cl or Br.

21. An antimicrobial polymer additive comprising
a sterically hindered N-halo-amine comprising the moiety of 2,2,6,6-tetramethyl-N-chloro-4-piperidinyl structure with a molecular weight of at least 350 g/mol.

22. The additive of claim 21, wherein the sterically hindered N-halo-amine is selected from the group consisting of: Bis(N—X-2,2,6,6-tetramethyl-4-piperidyl) sebacate; Poly[[6-[(1,1,3,3-tetramethylbutyl)amino]-s-triazine-2,4-diyl]-N—X-[(2,2,6,6-tetramethyl-4-piperidyl)imino]-hexamethylene-[(2,2,6,6-tetramethyl-4-piperidylimino]]; N—X-[(2,2,6,6-tetramethyl-4-piperidyl)alkyl formate]; Poly[(6-morpholino-s-triazine-2,4-diyl)-N—X-[2,2,6,6-tetramethyl-4-piperidyl]imino]-hexamethylene[(2,2,6,6-tetramethyl-4-piperidyl)imino]]; 3-Dodecyl-N—X-(2,2,6,6-tetramethyl-4-piperidinyl)succinimide; 2,2,4,4-Tetramethyl-N—X-7-oxa-3,20-diazadispiro[5.1.11.2]-heneicosan-21-one; D-Glucitol, 1,3:2,4-bis-O—(N—X-2,2,6,6-tetramethyl-4-piperidinylidene); 1,1'-ethylenebis(N—X-3,3,5,5-tetramethyl-piperazinone); N—X-2,2,4,4-tetramethyl-7-oxa-20-(oxiranylmethyl)-3,20-diazadispiro[5.1.11.2]henicosan-21-one; 1,2,3,4-Butanetetracarboxylic acid, polymer with β,β,β',β"-tetramethyl-2,4,8,10-tetraoxaspiro[5.5]undecane-3,9-diethanol, N—X-2,2,6,6-tetramethyl-4-piperidinyl ester; Poly[oxy[methyl[3-[N—X-(2,2,6,6-tetramethyl4-piperidinyl)-oxy]propyl]silylene]]; 1,1',1"-[1,3,5-Triazine-2,4-6-triyltris[(cyclohexylimino)ethylene]]tris(N—X-3,3,5,5-tetramethyl-piperazinone); and mixtures and combinations thereof, wherein X is Cl or Br.

* * * * *

UNITED STATES PATENT AND TRADEMARK OFFICE
CERTIFICATE OF CORRECTION

PATENT NO. : 7,541,398 B2
APPLICATION NO. : 11/324616
DATED : June 2, 2009
INVENTOR(S) : Yuyu Sun and Zhaobin Chen It is certified that error appears in the above-identified patent and that said Letters Patent is hereby corrected as shown below:

Col. 1, line 31
Replace "siderable interests (2-12)" with --siderable interest (2-12)--

Col. 1, line 45
Replace "successful, candidates of" with --successful candidates for--

Col. 1, line 49
Replace "toxicity to human" with --toxicity to humans--

Col. 4, line 1
Replace "a coating, paint and" with --a coating, a paint and--

Col. 14, line 43
Replace "THF, DMF, or DMSO" with --THF, DMF or DMSO--

Col. 27, line 8
Replace "halides is selected from" with --halides selected from--

Col. 27, lines 17-18
Replace "drugs resistant and combinations or the thereof" with --drug resistant and combinations thereof--

Col. 27, line 20
Replace "additive is with a polymer formed by extrusion" with --additive is added to a polymer and processed by extrusion--

UNITED STATES PATENT AND TRADEMARK OFFICE
CERTIFICATE OF CORRECTION

PATENT NO. : 7,541,398 B2
APPLICATION NO. : 11/324616
DATED : June 2, 2009
INVENTOR(S) : Yuyu Sun and Zhaobin Chen It is certified that error appears in the above-identified patent and that said Letters Patent is hereby corrected as shown below:

Col. 27, line 66-67
Replace "drugs resistant and combinations or the thereof" with --drug resistant and combinations thereof--

Signed and Sealed this

Twenty-fourth Day of November, 2009

David J. Kappos
*Director of the United States Patent and Trademark Office*